US009243846B2

(12) United States Patent
Cummins et al.

(10) Patent No.: US 9,243,846 B2
(45) Date of Patent: Jan. 26, 2016

(54) HEAT EXHANGING APPARATUS

(71) Applicants: DENSO Marston Ltd., West Yorkshire (GB); DENSO CORPORATION, Kariya, Aichi-pref. (JP)

(72) Inventors: Craig Cummins, Huddersfield (GB); Thomas Williams, Thackley (GB)

(73) Assignees: DENSO Marston Ltd., Shipley, West Yorkshire (GB); DENSO CORPORATION, Kariya (JP)

( * ) Notice: Subject to any disclaimer, the term of this patent is extended or adjusted under 35 U.S.C. 154(b) by 0 days.

(21) Appl. No.: 14/448,219

(22) Filed: Jul. 31, 2014

(65) Prior Publication Data

US 2015/0034281 A1  Feb. 5, 2015

(30) Foreign Application Priority Data

Aug. 2, 2013  (GB) .................. 1313856.5

(51) Int. Cl.
*B60K 11/08* (2006.01)
*F28D 1/00* (2006.01)
*F28F 27/00* (2006.01)
*B60K 11/04* (2006.01)
*F01P 3/18* (2006.01)
*F28D 1/04* (2006.01)
*F28D 1/053* (2006.01)
(Continued)

(52) U.S. Cl.
CPC . *F28D 1/00* (2013.01); *B60K 11/04* (2013.01); *F01P 3/18* (2013.01); *F02B 29/0456* (2013.01); *F28D 1/0452* (2013.01); *F28D 1/0461* (2013.01); *F28D 1/05366* (2013.01); *F28F 27/00* (2013.01); *F01P 2003/187* (2013.01); *F28D 2021/0082* (2013.01); *F28D 2021/0089* (2013.01); *F28D 2021/0094* (2013.01)

(58) Field of Classification Search
CPC ........ B60K 11/00; B60K 11/02; B60K 11/04; B60K 11/08
USPC ................................................. 180/68.1–68.6
See application file for complete search history.

(56) References Cited

U.S. PATENT DOCUMENTS 6,564,857 B1  5/2003 Zobel et al.
7,128,178 B1  10/2006 Heinle et al.
(Continued)

FOREIGN PATENT DOCUMENTS

DE      3508240     9/1986
DE    197 24 728    2/1999
(Continued)

OTHER PUBLICATIONS

Search Report dated Feb. 17, 2014 in corresponding Gt. Britain Application No. GB1313856.5.

*Primary Examiner* — John Walters
*Assistant Examiner* — James Triggs
(74) *Attorney, Agent, or Firm* — Harness, Dickey & Pierce, P.L.C.

(57) ABSTRACT

A heat exchanging apparatus comprises a first heat exchanger, oil cooler, arranged to allow ambient air to pass therethrough and a second heat exchanger, radiator, adjacent the first heat exchanger and arranged to allow air exiting the first heat exchanger to pass therethrough. The apparatus further comprises a third heat exchanger comprising two or more interconnected heat exchanging cores, charge air coolers. Each core is arranged to allow ambient air to pass therethrough.

28 Claims, 14 Drawing Sheets

(51) Int. Cl.
*F02B 29/04* (2006.01)
*F28D 21/00* (2006.01)

(56) References Cited

U.S. PATENT DOCUMENTS

| | | |
|---|---|---|
| 7,814,963 B2 * | 10/2010 | Adamson et al. ............... 165/41 |
| 2002/0189786 A1 | 12/2002 | Fischer et al. |
| 2005/0178348 A1 | 8/2005 | Werner et al. |
| 2006/0269809 A1 | 11/2006 | Sakai et al. |
| 2009/0277601 A1 | 11/2009 | Al-Shawaf et al. |
| 2011/0053025 A1 | 3/2011 | Kim et al. |
| 2012/0085510 A1 | 4/2012 | Kim et al. |

FOREIGN PATENT DOCUMENTS

| | | |
|---|---|---|
| DE | 197 24 738 | 2/1999 |
| JP | 2006-207944 | 8/2006 |

* cited by examiner

HEAT EXHANGING APPARATUS

The invention relates to a heat exchanging apparatus, particularly those used for off highway vehicles such as tractors, or the like.

Heavy duty off highway vehicles such as tractors and diggers employ several heat exchangers including an oil cooler, a radiator and a charge air cooler (CAC) which collectively form a heat exchanging apparatus. Each heat exchanger comprises a core typically having a fin and tube type construction. High temperature fluid from one of the vehicle's systems is directed through the tubes while ambient air is directed, by the fins, over the tubes so as to extract heat from the hot fluid. The fluid temperature of each system thus reduces whilst the ambient air temperature increases.

With reference to FIG. 1, a conventional heat exchanging apparatus 1 comprises an oil cooler 2 arranged to allow ambient air to pass through, a CAC 3 arranged to allow air exiting the oil cooler 2 to pass through and a radiator 4 arranged to allow air exiting the CAC 3 to pass through. A fan 5 is provided to direct the air through the apparatus. A cowl 6 is employed surrounding the exit of the radiator 4. The cowl 6 forms a chamber which reduces in pressure by operation of the fan 5 so as to draw air through the heat exchangers. Air passing through successive heat exchangers gradually increases in temperature thus reducing the efficiency of those heat exchangers located downstream.

Advances in engine technology, especially emissions reductions, are leading to increasingly high thermal performance demands which require larger heat exchangers. In particular, the cooling systems associated with emissions technology require larger charge air coolers and radiators. However the space envelope available for these heat exchangers, particularly on off-highway vehicles, is limited by track width and bonnet sight lines. Traditional heat exchanging apparatus in that envelope often cannot meet performance targets and requires one or more of the heat exchangers to be compromised.

U.S. Pat. No. 7,128,178 describes an arrangement of heat exchangers which includes a water radiator, a gear oil radiator, a booster air radiator, a hydraulic oil and fuel radiator, and a condenser all arranged in a box formation, with each radiator forming one side of the box. Each of the heat exchangers is arranged to allow ambient air to be drawn through by a fan behind the box. There is a large empty space inside the box which increases the space envelope. This arrangement is inflexible and does not allow efficient use of space especially where the sizes of the heat exchangers are mismatched. An installation like this, with one heat exchanger making up each side of the box is inflexible as the overall size of the box is dictated by the largest heat exchanger. Additionally there can be a requirement to use blanking plates on the sides of the box where the heat exchangers are smaller, this is an inefficient use of space. Also, the air passing through the radiator, which forms the back of the box, has been pre-heated by all the other heat exchangers that make the box, reducing the ambient capability of the radiator. The efficiency of the radiator at the back of the box is significantly reduced because the air it receives has been preheated by not just one or two but all of the other heat exchangers of the apparatus.

According to a first aspect of the present invention there is provided a heat exchanging apparatus, comprising:
   a first heat exchanger arranged to allow ambient air to pass therethrough;
   a second heat exchanger adjacent the first heat exchanger and arranged to allow air exiting the first heat exchanger to pass therethrough; and
   a third heat exchanger comprising two or more interconnected heat exchanging cores, wherein each core is arranged to allow ambient air to pass therethrough.

The term "interconnected" is defined in an operational sense such that fluid from a vehicle system is arranged to flow through each core.

Arranging two heat exchangers such that ambient air enters provides operational efficiency without compromising the effective spaced envelope. Dividing the third heat exchanger into two or more interconnected cores provides flexibility to their installation locations. This allows for further optimisation of the effective space envelope. By means of the invention, heat exchanger ambient capability is improved by eliminating pre-heat from the third heat exchanger, by moving this heat exchanger to a different position. The heat exchanger which has been removed from its conventional position is divided into smaller units which can be positioned in the space between the second heat exchanger and a fan. This layout improves module efficiency by increasing heat exchanger area open to ambient air without demanding a larger space envelope. This allows the performance of the divided heat exchanger to be improved without increasing the size of the vehicle/under bonnet space claim of the cooling pack or reducing the size and/or effectiveness of the radiator.

The apparatus may include a cowl arranged to direct the air flow through the heat exchangers. The cowl provides a degree of control over the air flow.

The cowl may be arranged to isolate the third heat exchanger so that only ambient air passes therethrough. Such an arrangement provides optimal efficiency for the third heat exchanger. The cowl preferably includes at least one portion which extends from the outer edge of the second heat exchanger to the inner edge of a third heat exchanger core. In this way, air going to or from the second heat exchanger does not go through the third heat exchanger. The said portion may be at an angle in the range 20° to 60° to the adjacent inlet or outlet face of the second heat exchanger.

The first and second heat exchangers may comprise an oil cooler or a radiator, and in one embodiment comprises an oil cooler and a radiator. The air exit temperature of each heat exchanger is sufficiently low that the operational efficiency of the second heat exchanger is not significantly compromised. The oil cooler is preferably upstream of the radiator. This provides the most efficient arrangement because air exit temperature of the oil cooler is lower than that of the radiator by direct comparison.

Each core of the third heat exchanger may comprise a Charge Air Cooler (CAC). Selecting the CAC so that ambient air enters is operationally efficient because the CAC creates a high ambient air temperature increase compared to other vehicle heat exchangers. The CAC may be downstream of the first and second heat exchangers. Such an arrangement does not compromise the efficiency of the first and second heat exchangers upstream.

The two or more CACs may be interconnected in parallel. The CACs have a relatively high pressure drop in use. The parallel interconnection means that the two or more CACs are operating at similar efficiencies. Conversely, the CACs may be interconnected in series. The series interconnection provides ease and flexibility of any routing between the CACs. The parallel interconnection into the heat exchanger has a lower pressure drop than the series arrangement.

The CACs may be interconnected by pipes or by CAC tanks.

The apparatus may comprise a fan for directing air through the arrangement of heat exchangers. The fan provides the volumetric flow rate of air through the apparatus. The fan may be an axial fan. The fan may be arranged to push air through the heat exchangers or the fan may be arranged to draw air through the heat exchangers.

The second heat exchanger may be arranged adjacent and substantially parallel to the first heat exchanger. The first heat exchanger may lie within the sectional envelope of the second heat exchanger. This minimises the effective space envelope.

In one embodiment the two or more cores of the third heat exchanger may be arranged at an acute angle with respect to the major plane of the second heat exchanger. This causes a streamlined airflow at the outlet of the heat exchangers. The two or more cores of the third heat exchanger may be arranged symmetrically about an air flow direction through the first and second heat exchangers. This further enhances the streamlined flow at exit from the heat exchangers.

The angle of the two or more cores with respect to the second heat exchanger may be from 10° to 40°. This range is most effective to ensure streamlined exit flow and reduce depth. An angle of the two or more cores with respect to the second heat exchanger of about 20° is particularly effective.

In another embodiment, the two or more cores of the third heat exchanger may be substantially perpendicular to the major plane of the second heat exchanger. This arrangement may be useful when integrating the apparatus into the vehicle depending on the location of the other vehicle hardware. The third heat exchanger may comprise three interconnected cores. In use, one of the three interconnected cores may be arranged at the top and other two cores may be arranged at the sides of the second heat exchanger.

In a particular embodiment, the second heat exchanger defines a sectional space envelope bounded by its periphery. It could be said that the entire face of the exit of the second heat exchanger, including any header plate, forms the sectional space envelope. The third heat exchanger may be arranged overlapping the sectional space envelope. Preferably, the majority of the area of the third heat exchanger overlaps the sectional space envelope. Indeed, the third heat exchanger may be arranged entirely within said sectional space envelope. This ensures that the effective lateral space envelope of the apparatus as a whole is minimised.

According to another aspect of the invention there is provided a heat exchanger assembly comprising at least three heat exchangers and a cowl to direct air flow through the heat exchangers, two of the heat exchangers being adjacent and each defining a major plane, the major planes being substantially parallel to one another, a third heat exchanger including a core on each of two sides of the assembly, the arrangement and cowl being such that air can flow through the third heat exchanger cores without passing through the first or second heat exchanger.

Embodiments of the present invention will now be described by way of example and with reference to the accompanying drawings, in which.

Figure 1:
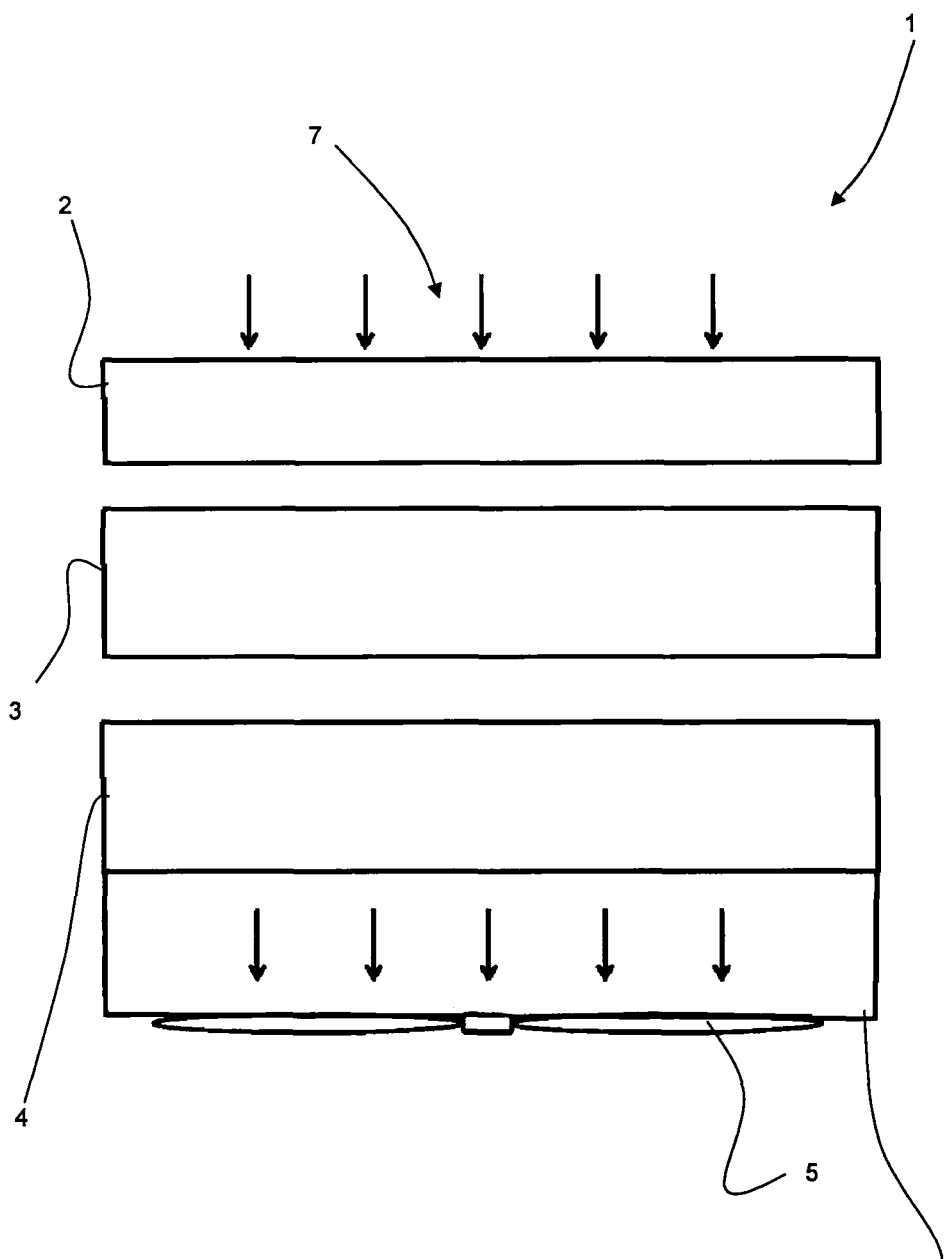
FIG. 1 is a schematic of a conventional prior art heat exchanging apparatus.
Figure 2:
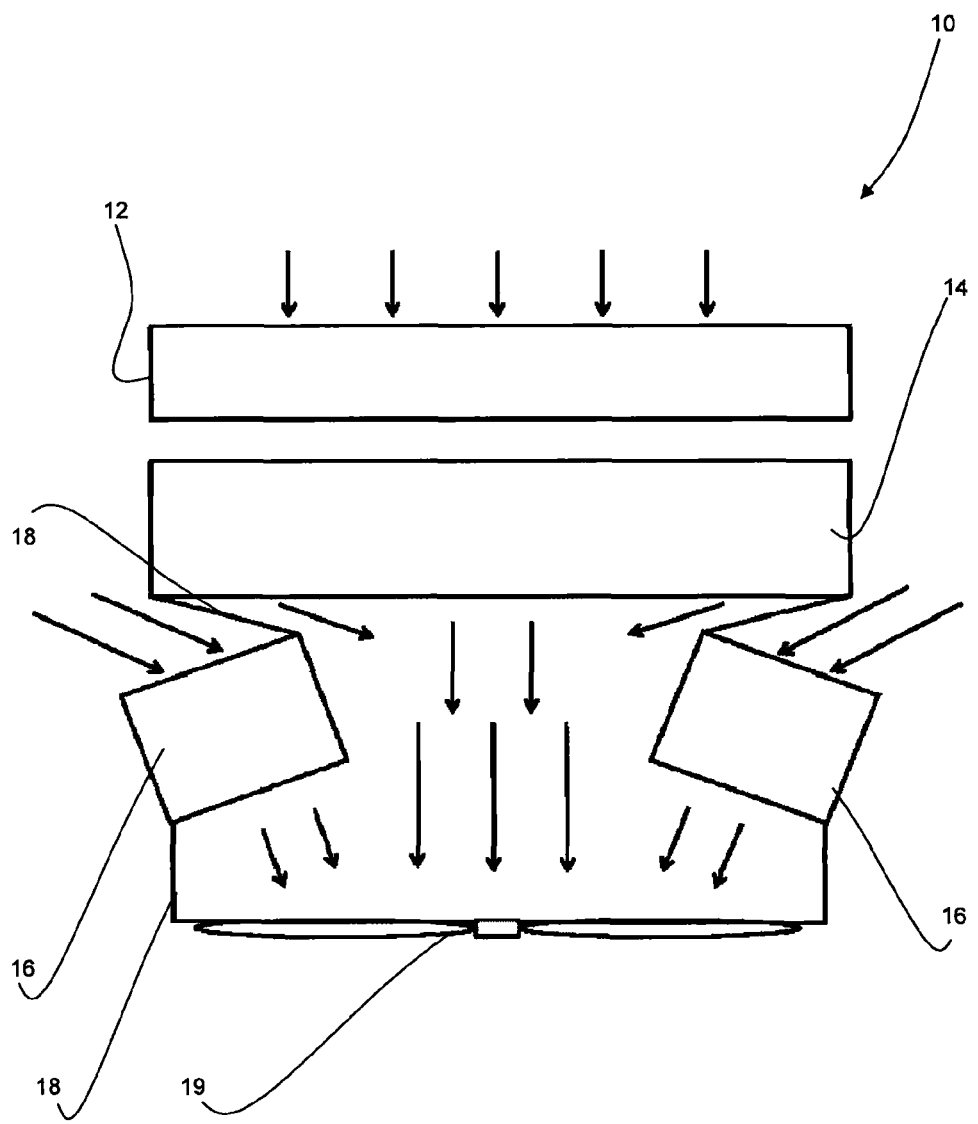
FIG. 2 is a schematic showing airflows through a heat exchanging apparatus in an embodiment according to the present invention.
Figure 3:
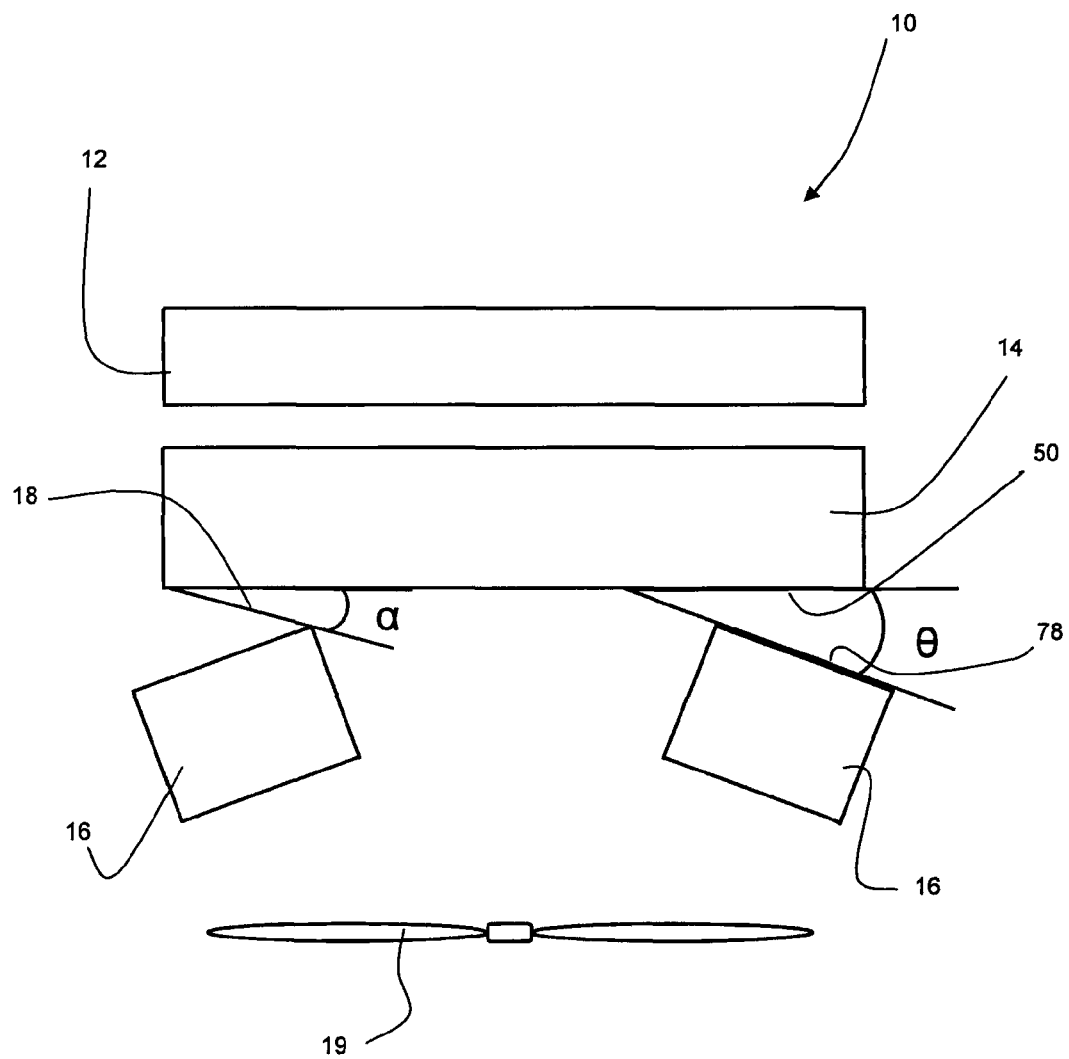
FIG. 3 is the view of FIG. 2 omitting airflow arrows.
Figure 4:
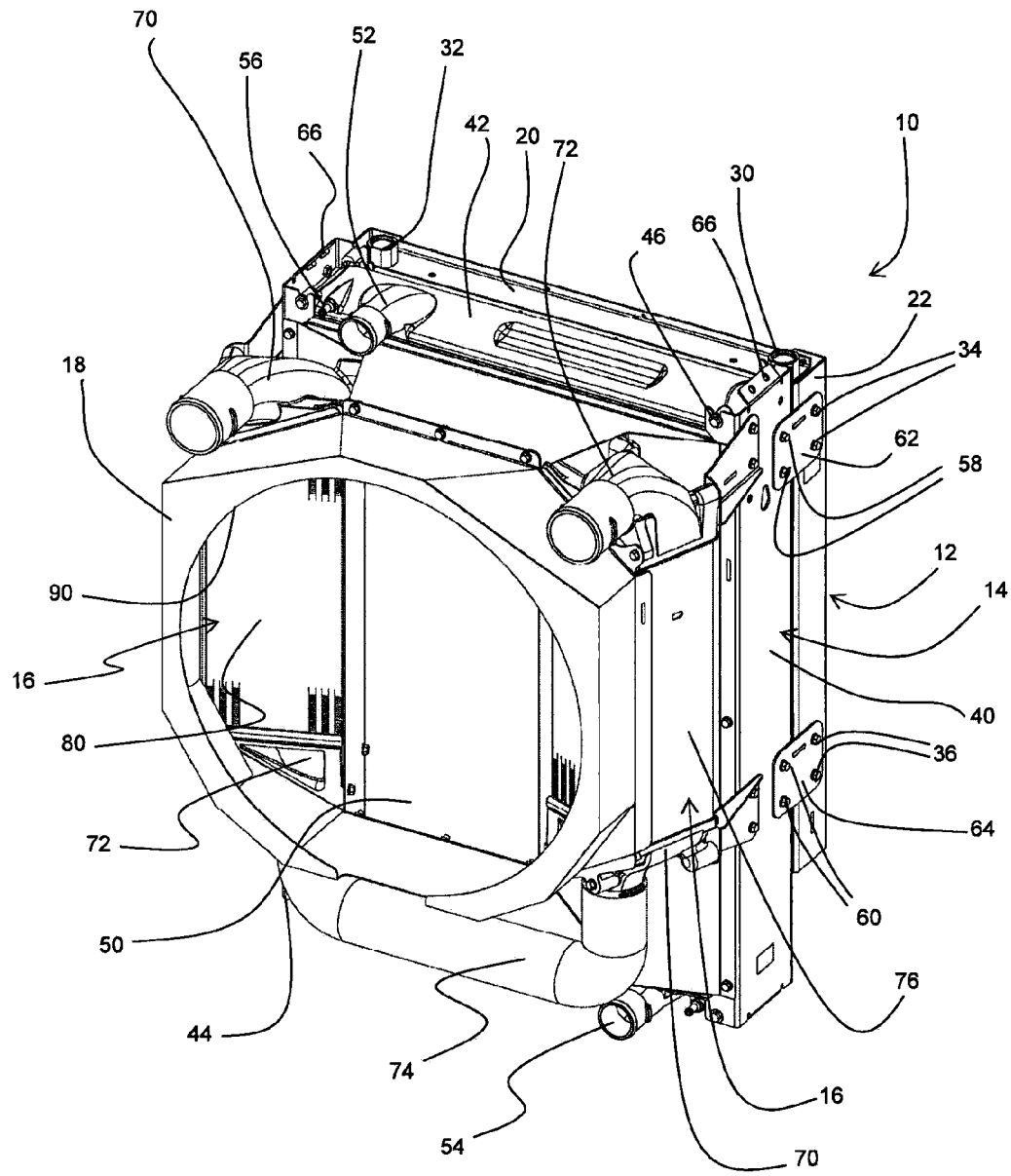
FIG. 4 is a perspective view of the heat exchanging apparatus of FIG. 2.
Figure 5:
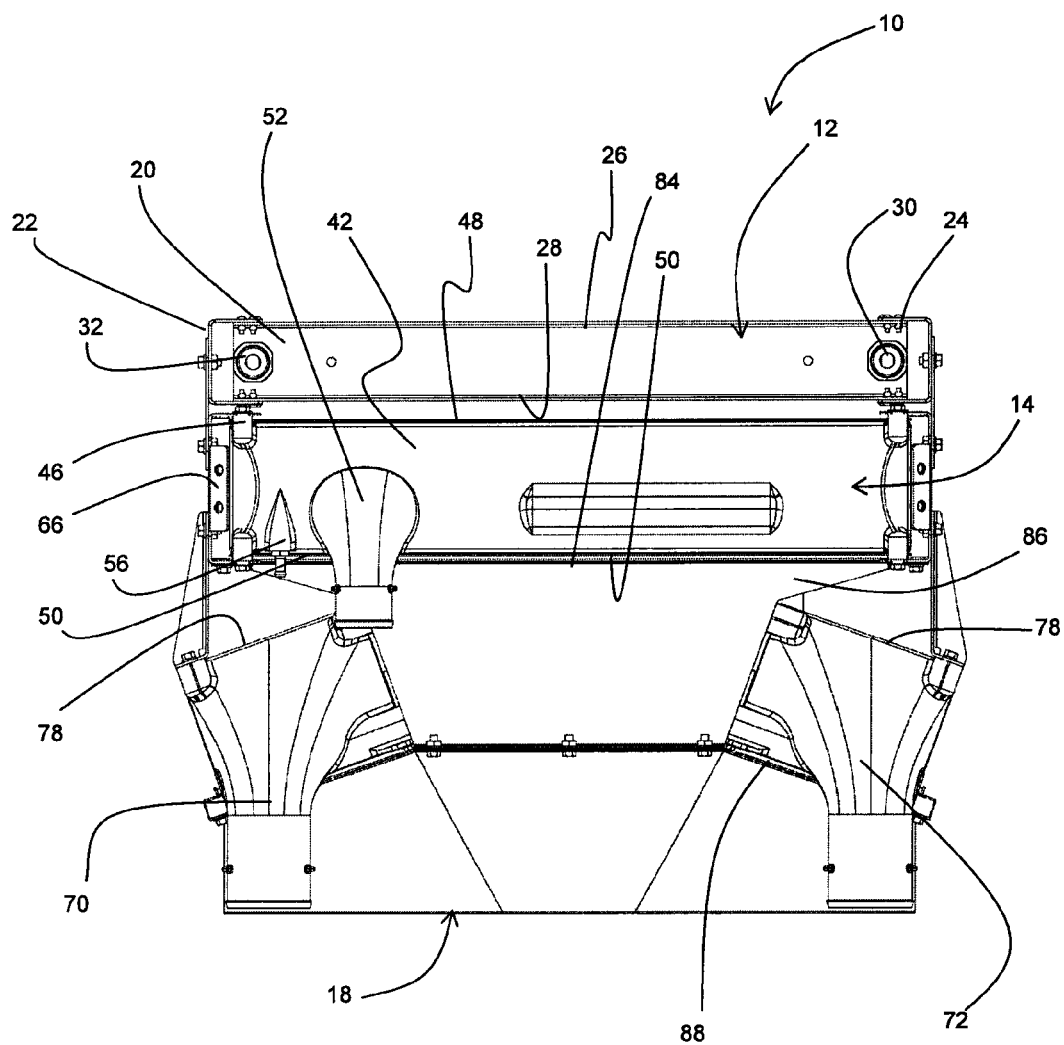
FIG. 5 is a top plan view of the heat exchanging apparatus of FIG. 4.
Figure 6:
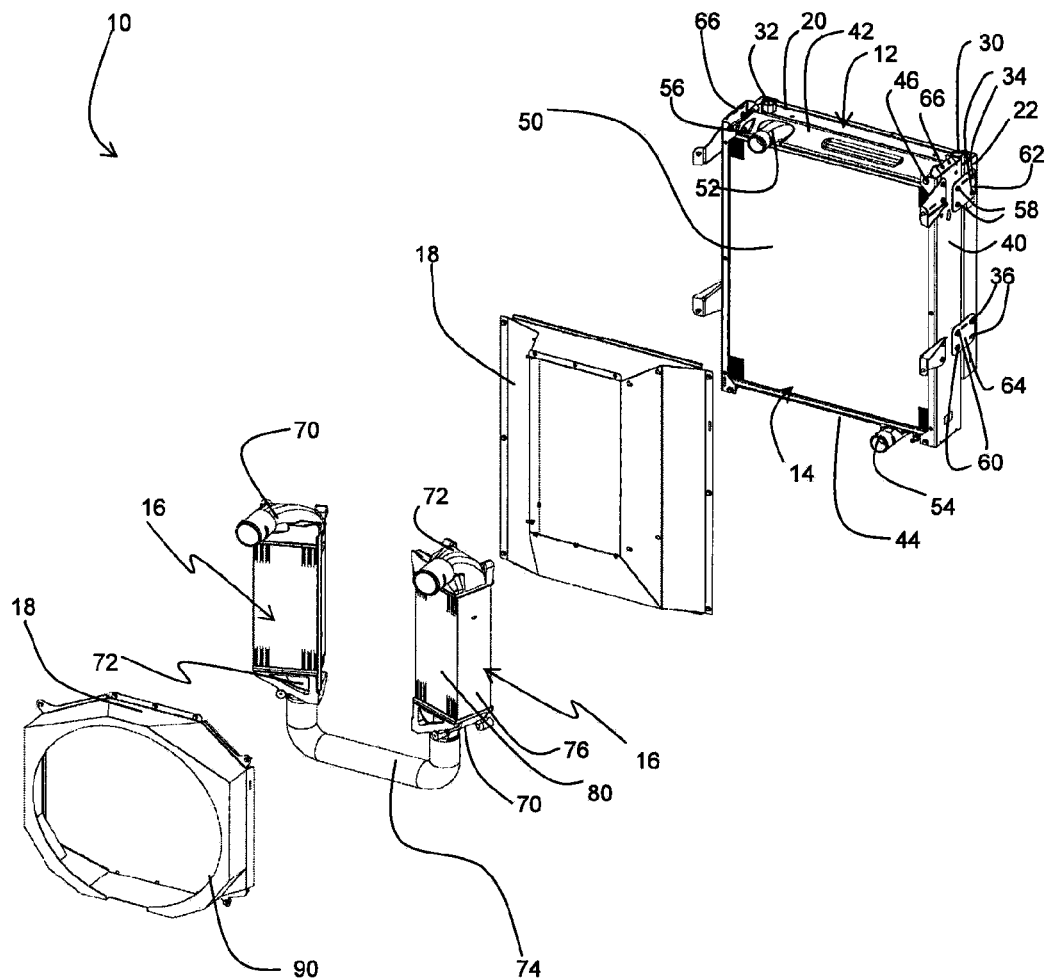
FIG. 6 is an exploded view of the heat exchanging apparatus of FIG. 4.

With reference to FIGS. 2 to 6 the heat exchanging apparatus 10 of the first embodiment comprises an oil cooler 12, a radiator 14, two charge air coolers 16 (CAC), a cowl 18 and an axial fan 19. The heat exchanging apparatus 10 is for an off highway vehicle.

The oil cooler 12 comprises a top plate 20 and bottom plate, a core and opposing mounting channels 22 on the sides. The mounting channels 22 are connected to the top 20 and bottom plates by fasteners 24 so as to form a box like structure. The core comprises a series of generally horizontal plates (not shown). The plates include the top plate 20, bottom plate and a plurality of gallery plates therebetween. The oil cooler 12 has an ambient air inlet face 26 and an exit face 28. An oil inlet port 30 is connected to the top plate 20 toward one side of the oil cooler 12. An oil exit port 32 is connected to the top plate 20 towards the other side of the oil cooler 12. The oil inlet and exit ports 30, 32 are arranged to connect to an oil supply and return lines in a conventional manner. Each mounting channel 22 is provided with a first and a second pairs of mounting holes 34, 36. The first and second pairs of mounting holes 34, 36 are vertically separated so as to be arranged in the vicinity of the top 20 and bottom plates respectively.

The radiator 14 comprises opposing side plates 40 connected to the ends of top and bottom header tanks 42, 44 in a conventional manner so as to form a box like structure. Fasteners 46 are provided to attach the side plates 22 to tanks. A core is provided intermediate the header tanks 42, 44 and side plates 40. The core has an inlet face 48 and an exit face 50. The core comprises a series of parallel tubes boring between the top and bottom header tank 42, 44 in a conventional manner. The core further comprises a series of fins intermediate the tubes so as to direct airflow therearound in use. A water inlet nozzle 52 is provided on the top header tank 44. The water inlet nozzle 52 is arranged to be connected to a water supply line in a conventional manner. A water exit nozzle 54 is provided on the bottom header tank 42. The water exit nozzle 54 is arranged to be connected to a water return line in a conventional manner. A bleed pipe 56 is provided on the top header 44 plate. A first and second pairs of mounting holes 58, 60 are provided on each side plate 40. The first and second pairs of mounting holes 58, 60 are arranged have the same separation distance as the first and second pairs of mounting holes 34, 36 of the oil cooler 12. A first bracket 62 is mounted to the first pair of mounting holes 34 of the oil cooler 12 and first pair of mounting holes 58 of the radiator 14 by fasteners. A second bracket 64 is mounted to the second pair of mounting holes 36 of the oil cooler 12 and the second pair of mounting holes 60 the radiator 14 by fasteners. When assembled, the exit face 28 of the oil cooler 12 is arranged adjacent to and upstream of the inlet face 48 of the radiator 14. An axial separation distance exists between the exit face 28 of the oil cooler 12 and the inlet face 48 of the radiator 14. The side plates 40 each comprise a flange 66 provided with fastener holes for securing the radiator 14 to a vehicle so as to secure the heat exchanging apparatus 10 thereto.

Each charge air cooler 16 comprises an inlet nozzle 72 and an outlet nozzle 70. The inlet nozzle 72 from one of the charge air coolers 16 is arranged to be connected to an air supply line from a vehicle turbo charger. The outlet nozzle 70 from the other charge air cooler 16 is arranged to be connected to an engine air supply line. The other outlet 70 and inlet 72 nozzles of the charge air coolers 16 are interconnected by a pipe 74. The charge air coolers 16 are thus interconnected in series. Each charge air cooler 16 comprises a core arranged intermediate opposing side plates 76. The core comprises a series of tubes arranged to direct charge air between the inlet 72 and outlet 70 nozzles. A series of fins are arranged intermediate the tubes so as to direct ambient air therearound in use. Each charge air cooler 16 comprises an inlet face 78 and an exit face 80. The charge air coolers 16 are rotated inwards such that the inlet faces 78 form an acute angle with respect to the exit face 50 of the radiator 14. The charge air coolers 16 are symmetrically arranged about an imaginary flow axis through the radiator 14. The angle θ of the inlet faces 78 of the charge air coolers 16 is about 20° with respect to the exit face 50 of the radiator 14. The charge air coolers 16 are both arranged to overlap a sectional space envelope bounded by the periphery of the radiator 14 so that the majority of their area overlaps the sectional space envelope.

The cowl 18 comprises a primary inlet 84 forming an inlet to a converging portion 86. The converging portion 86 of the cowl is at an angle α of 16° with respect to the exit face 50 of the radiator 14. The primary inlet 84 surrounds the exit face 50 of the radiator 14. The cowl 18 also has two secondary inlets 88 arranged at opposing sides of the cowl 18 and at the termination of the converging portion. The secondary inlets 88 are arranged to surround the exit faces 80 of the charge air coolers 16. The cowl 18 forms a box-like structure downstream of the secondary inlets 88 having an end face provided with a circular aperture 90. The circular aperture 90 is arranged to surround the axial fan 19. The cowl 18 is mounted to the side plates 40 of the radiator.

In operation, the fan 19 rotates so as to create a negative pressure within the cowl 18. Ambient air located at the ambient inlet volume upstream of the inlet face 78 of each charge air cooler 16 is drawn through the core of the charge air coolers 16 as a result of the pressure differential. Similarly, ambient air located in the ambient inlet volume upstream of the inlet face 26 of the oil cooler is drawn through the core of the oil cooler 12, through the exit face 28 of the oil cooler to the axial separation space between the oil cooler 12 and the radiator 14. The air exiting the oil cooler 12 continues through the inlet face 48, the core, and the exit face 50 of the radiator. The air exiting the radiator 14 is drawn towards the fan 19 and is directed around the charge air coolers 16 by the converging portion 86 of the cowl 18. The inlet faces 78 of the charge air coolers 16 are thus isolated from the air exiting the radiator 14 by the cowl 18. The air passing through the respective cores of the heat exchangers extracts heat from the high temperature fluids within each of the heat exchangers of the heat exchanging apparatus 10.

Thus, the air from the oil cooler 12 and radiator 14 does not pass through the charge air coolers 16, which instead receives ambient air and so can work more effectively. Because the charge air coolers 16 receive ambient air, they can be smaller allowing a gap between them for air flow for the radiator 14 and oil cooler 12. The apparatus does not have to be wider than the known apparatus, because the converging portion 86 of the cowl 18 directs ambient air in behind the charge air coolers 16 to reach them. The overall depth of the apparatus from front to back is much the same as the depth of the known apparatus of FIG. 1. The angling of the charge air coolers 16 means that the depth is not increased much. Each heat exchanger receives air which has been through at most only one other heat exchanger. Two heat exchangers receive air which has been through no other heat exchanger of the apparatus, in other words, ambient air.

The oil cooler 12, the radiator 14, and the charge air coolers 16 are all fabricated in a conventional manner. Sheet aluminium is preferably used to form each heat exchanger. However, the header tank may be formed from plastic.

The angle θ of the inlet face of the CACs 16 with respect to the exit face of the radiator is described in the first embodiment as 20°. The angle α of the fan cowl with respect to the exit face of the radiator is described in the first embodiment as 16°. The angle θ of the inlet face of the CACs with respect to the exit face of the radiator may vary within the range of 0° to 90°. The angle α of the fan cowl with respect to the exit face of the radiator would vary as a result of the change in orientation of the CACs. Embodiments 2 and 3 below are intended to illustrate two of the possible modifications available to a skilled person when using the full range of CAC orientation as described hereinabove.

Figure 7:
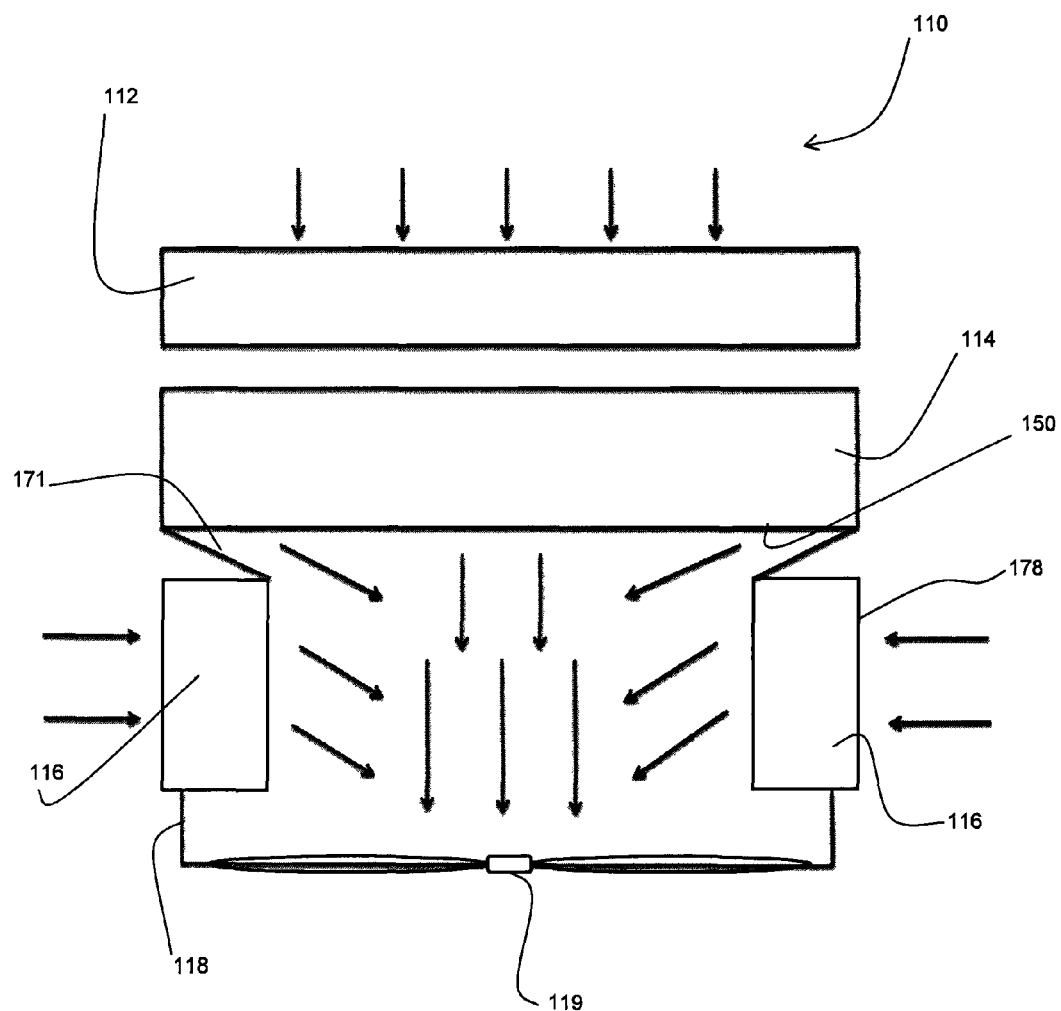
FIG. 7 is a schematic showing airflows through a second embodiment of the heat exchanging apparatus.
Figure 8:
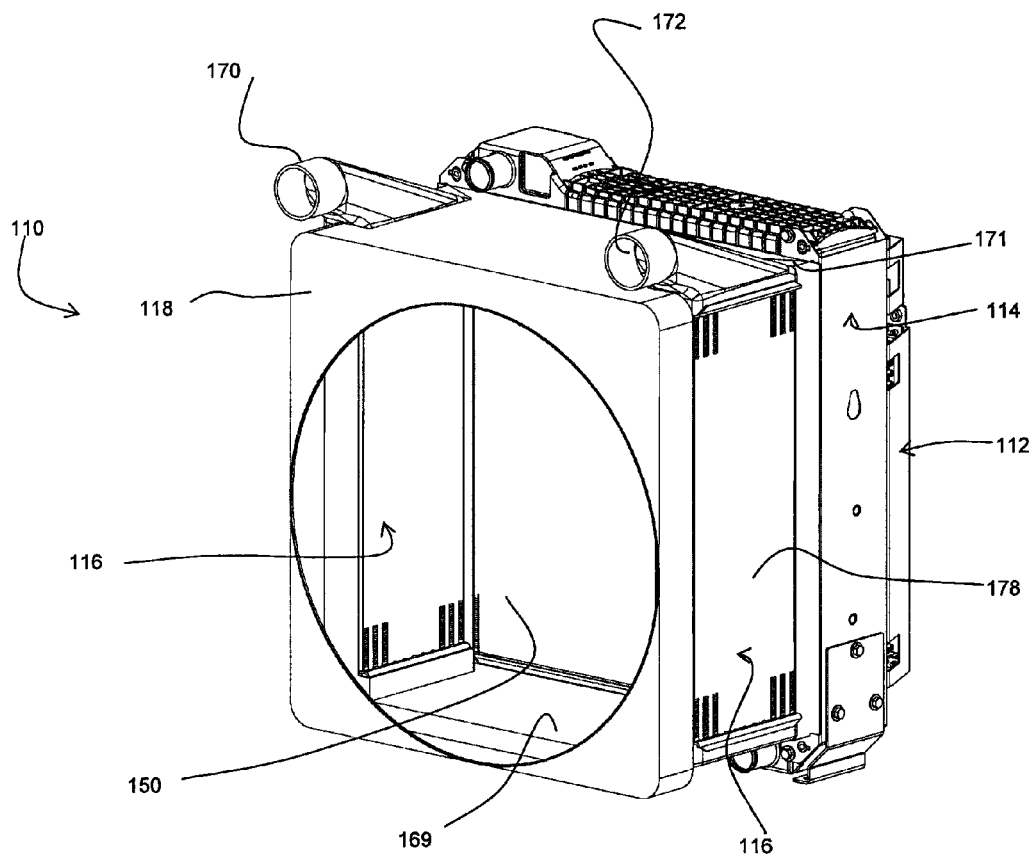
FIG. 8 is a perspective view of a heat exchanging apparatus according to the second embodiment of the present invention.
Figure 9:
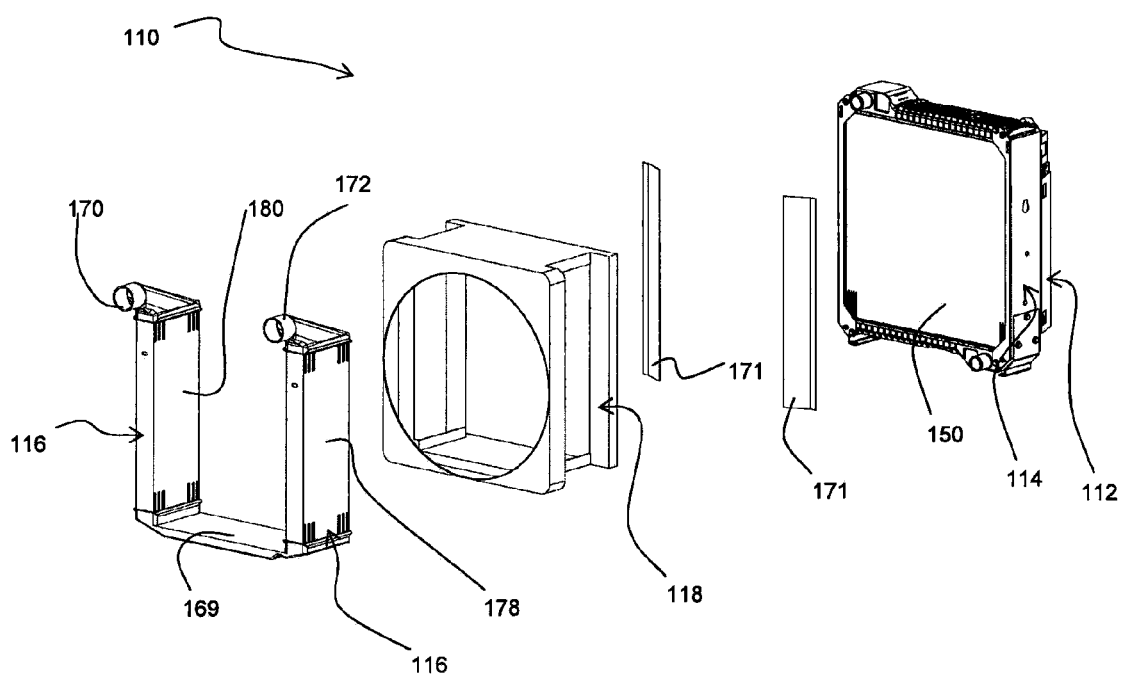
FIG. 9 is an exploded view of the heat exchanging apparatus of FIG. 8.

FIGS. 7 to 9 show a second embodiment of the heat exchanging apparatus 110. The second embodiment is similar to the first embodiment and only the differences from the first embodiment will be described. Those features in common with the first embodiment share the same reference numerals prefixed with a 1.

The angle θ of the inlet faces 178 of the charge air coolers 116 is about 90° with respect to the exit face 150 of the radiator 114. A pair of flow diverters 171 are provided at the inlet to the cowl 118 to imitate the diverging portion 86 of the cowl 18 of the first embodiment. The CACs 116 are within the sectional envelope of the radiator 114. This minimises the space occupied by the heat exchanging apparatus 110. Accordingly, the angle α of the flow diverters 171 with respect to the exit face 150 of the radiator 114 is about 25°. A further modification of the second embodiment with respect to the first is that the pipe 74 interconnecting the two CACs 116 has been replaced by a charge air tank 169.

Figure 10:
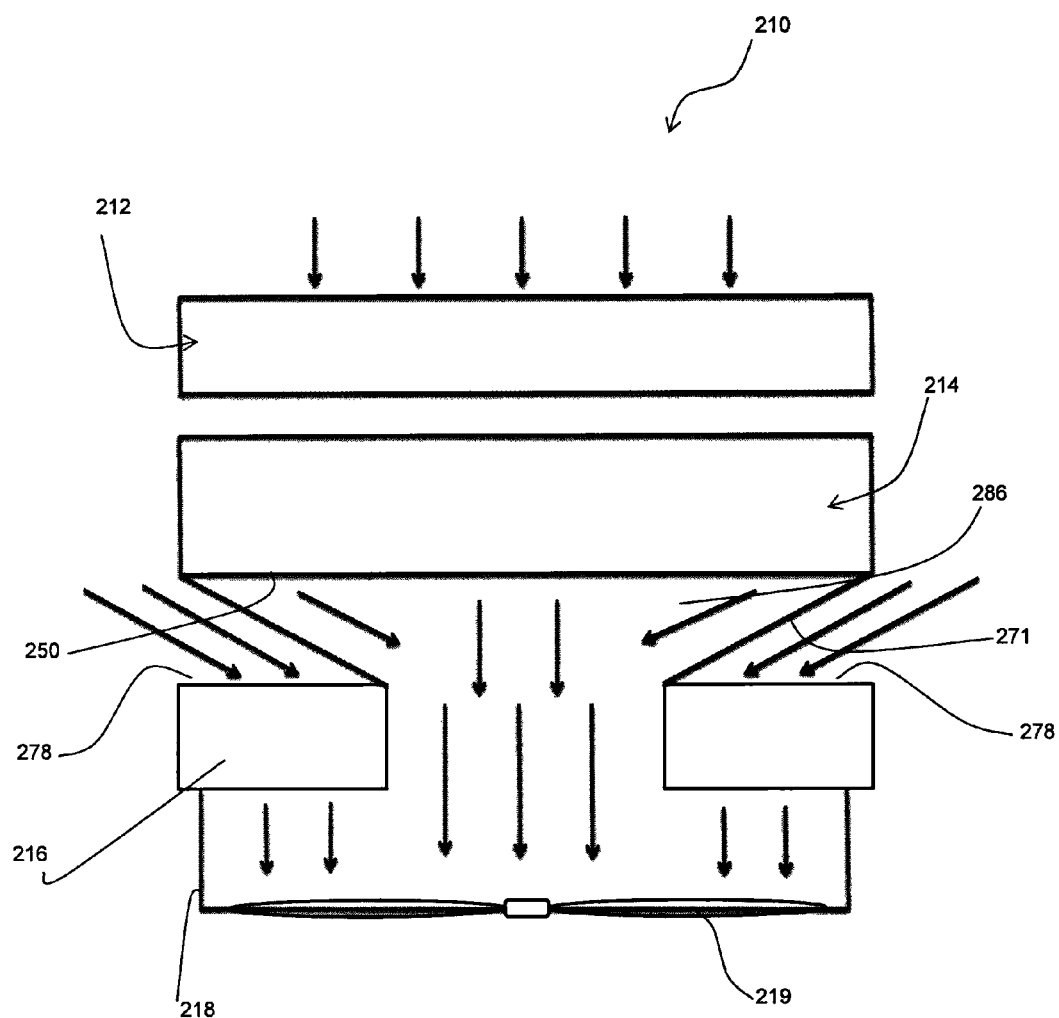
FIG. 10 is a schematic showing airflows through a third embodiment of the heat exchanging apparatus.

FIG. 10 shows a third embodiment of the heat exchanging apparatus 210. The third embodiment is similar to the first embodiment and only the differences from the first embodiment will be described. Those features in common with the first embodiment share the same reference numerals prefixed with a 2.

The angle θ of the inlet faces 278 of the charge air coolers 216 is about 0° with respect to the exit face 250 of the radiator 214. The angle α of the converging portion 286, formed by the flow diverters 271, of the cowl 218 with respect to the exit face 250 of the radiator 214 is changed accordingly, to 30°.

Figure 11:
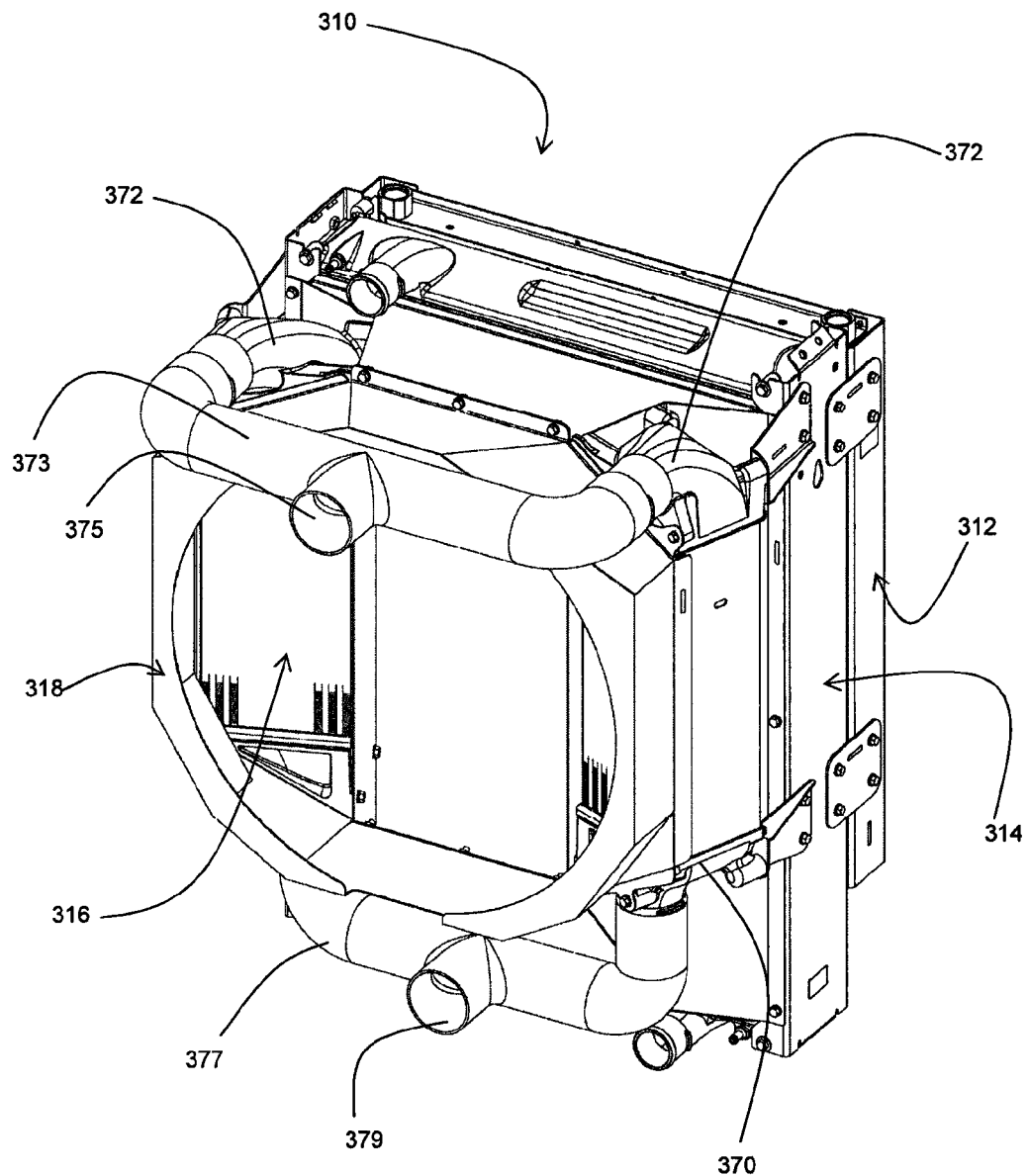
FIG. 11 is a perspective view of a heat exchanging apparatus according to a fourth embodiment of the present invention.
Figure 12:
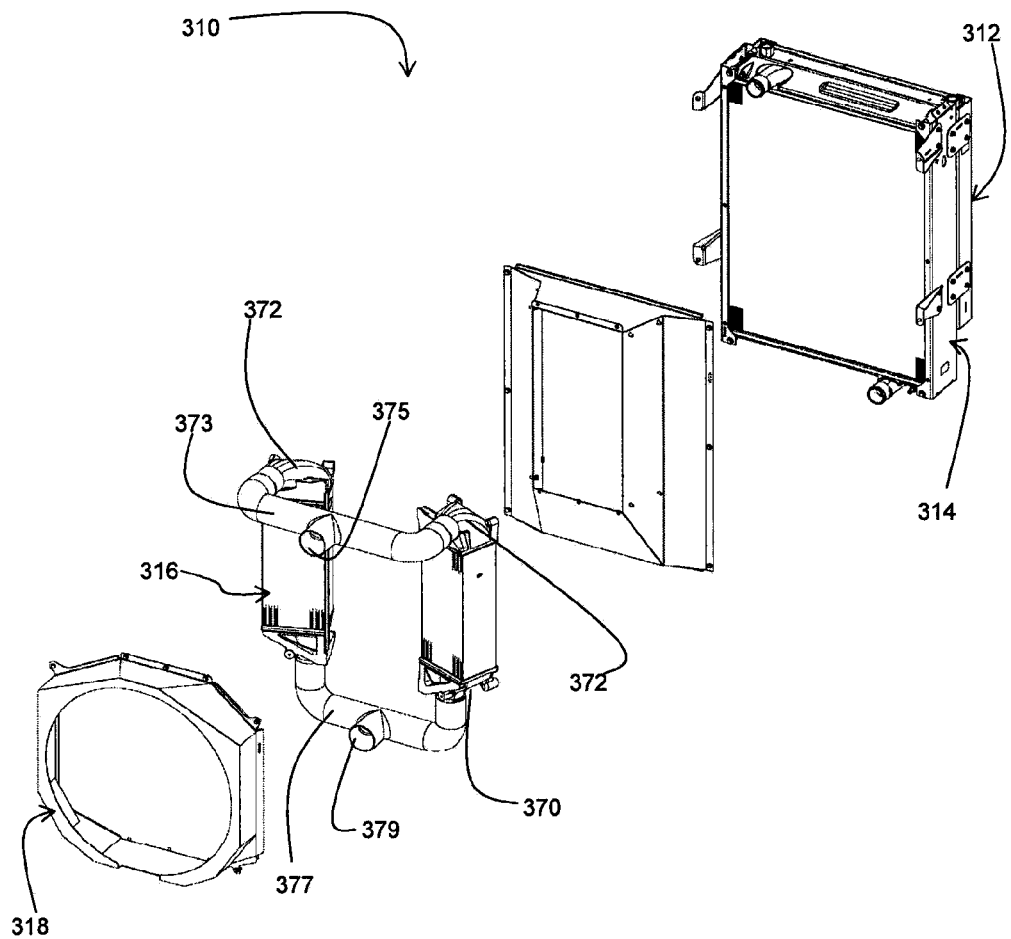
FIG. 12 is an exploded view of the heat exchanging apparatus of FIG. 11.

FIGS. 11 and 12 show a heat exchanging apparatus 310 in a fourth embodiment of the invention. The fourth embodiment is similar to the first and only the differences from the first embodiment will be described. Those features in common with the first embodiment share the same reference numerals prefixed with a 3.

The inlet nozzles 372 of the charge air coolers 316 are arranged at the top of the heat exchanging apparatus 310. The outlet nozzles 370 are arranged at the bottom of the heat exchanging apparatus 110. The inlet nozzles 372 are connected together by an inlet pipe 373. The outlet nozzles 370 are connected together by an outlet pipe 377. The inlet pipe 373 comprises an inlet port 375 arranged to be connected to an air supply line from a turbo charger. The outlet pipe 377 comprises an outlet port 379 arranged to be connected to an engine air supply line. The charge air coolers 316 are thus arranged in parallel with one another. Operationally, the charge air experiences a pressure drop when passing through the charge air cooler 316 core during cooling. Diverting the charge air across two parallel charge air coolers 316 such that the two charge air streams experience the same pressure drop results in the same amount of cooling. Dividing the flow into two effectively increases the flow area and at the same time reduces the flow distance.

Figure 13:
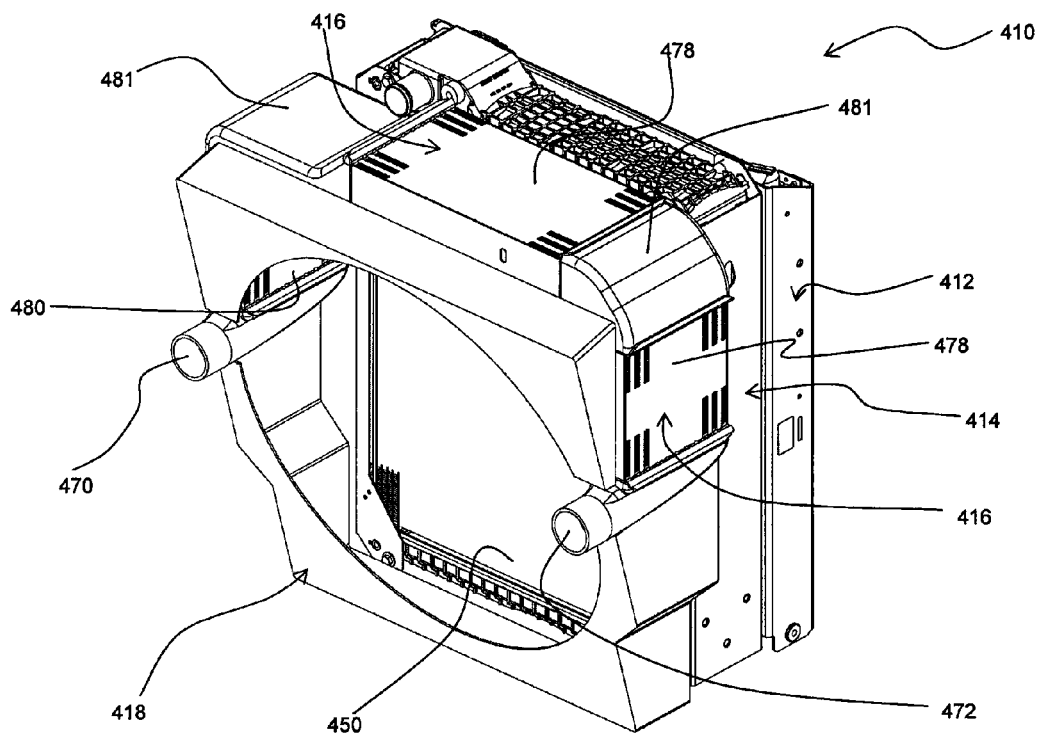
FIG. 13 is a perspective view of a heat exchanging apparatus in a fifth embodiment of the invention; and, FIG. 14 is a top plan view of the heat exchanging apparatus of FIG. 13.
Figure 14:
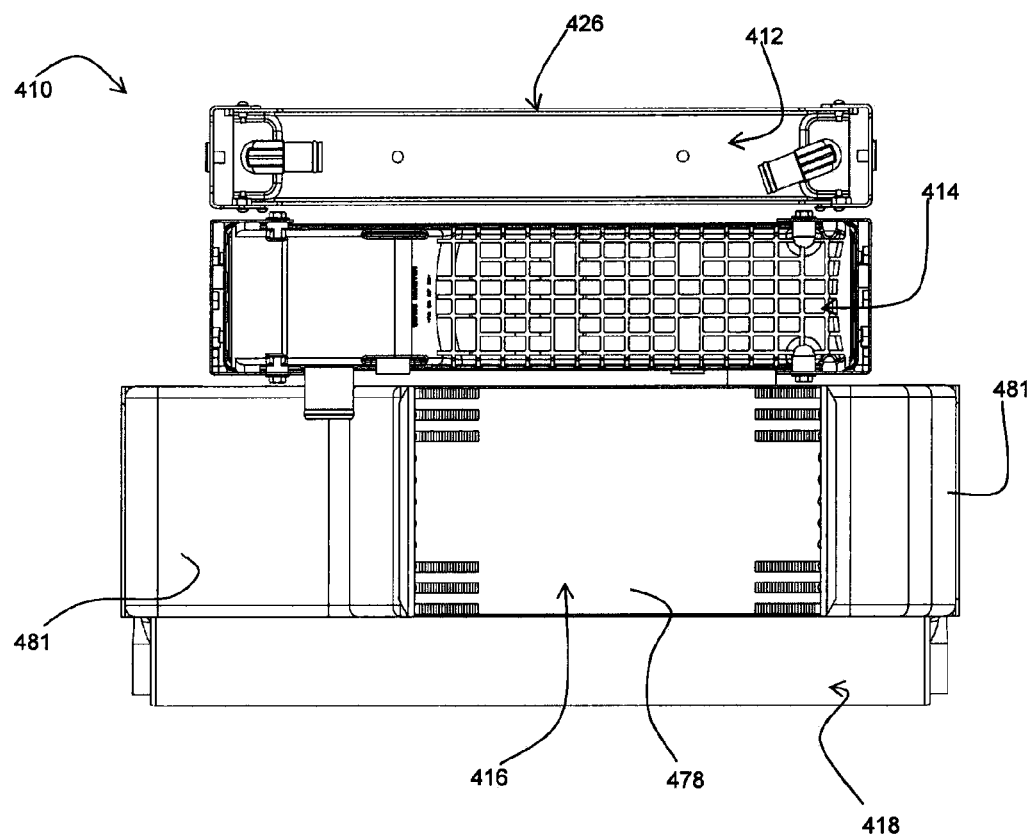

FIGS. 13 and 14 show a heat exchanging apparatus 410 in a fifth embodiment of the invention. The fifth embodiment is similar to the first and only the differences from the first embodiment will be described. Those features in common with the first embodiment share the same reference numeral prefixed with a 4.

The heat exchanging apparatus 410 comprises three charge air coolers 416. Each charge air cooler 416 is arranged substantially perpendicular to the exit face 450 of the radiator 414. One of the three charge air coolers 416 is arranged at the top of the heat exchanging apparatus 410. The other two charge air coolers 416 are arranged at either side and towards the top of the heat exchanging apparatus 410. Two charge air cooling tanks 481 are provided; one connecting the top charge air cooler 416 to one of the side charge air coolers 416, the other connecting the top charge air cooler 416 to the charge air cooler 416 at the other side. The three charge air coolers 216 are thus interconnected in series. An inlet nozzle 472 and an outlet nozzle 470 are provided on the opposing side charge air coolers 416. The inlet face 478 of each of the charge air coolers 416 is directed away from the heat exchanging apparatus 410. The exit face 480 of each of the charge air coolers 416 is located internal to the cowl 418. The cowl 418 in this third embodiment comprises a single inlet. The single inlet surrounds the exit faces 480 of the three charge air coolers 416 and the radiator 414. The three charge air coolers 416 are mounted directly to the radiator 414.

The ambient air inlet volume for the oil cooler 412 is located in front of the oil cooler inlet face 426. The ambient air inlet volume for the charge air coolers 416 is arranged above and to the sides of the heat exchanging apparatus 410. The negative pressure internal to the cowl 418 draws ambient air through the oil cooler 412 and radiator 414 as well as through the charge air coolers 416. In contrast to the first and second embodiments, the ambient inlet volume of the charge air coolers 416 is separated from the air exiting the exit face of the radiator 414 by means of the orientation of the charge air cooler 416 with respect to the radiator 414 rather than being isolated by the cowl 418.

It will be appreciated that there are some alternatives to the features described in the aforementioned embodiments. All of the embodiments described hereinabove describe a heat exchanging apparatus 10 having a first heat exchanger comprising an oil cooler 12, a second heat exchanger comprising a radiator 14, and two or more charge air coolers 16 forming a third heat exchanger. The selection of those particular heat exchangers is particularly relevant to a heavy vehicle such as a tractor. However, those particular heat exchangers could be replaced by other similar heat exchangers if the heat exchanging apparatus 10 is incorporated onto another vehicle using other types of heat exchangers.

The axial fan 19 has been described as drawing air through each of the heat exchangers. In contrast, an axial fan 19 arranged to push, or force, air through the heat exchangers could also be used by positive pressure.

The charge air coolers 16 have been described as overlapping the sectional envelope defined by the periphery of the radiator 14. In an alternative arrangement, the charge air coolers 16 are arranged within the sectional envelope defined by the periphery of the radiator 14 so that the radiator 14 is the outermost part of the heat exchanging apparatus 10 perpendicular to an imaginary air flow axis. This arrangement is advantageous since it minimises the effective lateral space envelope.

The interconnection of the charge air coolers is defined above as being in series or parallel. Charge air cooler tanks or pipes may be used where appropriate for either arrangement.

The invention claimed is:

1. A heat exchanging apparatus, comprising;
   a first heat exchanger arranged to allow ambient air to pass therethrough;
   a second heat exchanger adjacent the first heat exchanger and arranged to allow air exiting the first heat exchanger to pass therethrough;
   a third heat exchanger comprising two or more interconnected heat exchanging cores wherein each core is arranged to allow ambient air to pass therethrough; and
   a cowl arranged to direct the flow through the heat exchangers; wherein
   the cowl is arranged to isolate the cores of the third heat exchanger so that only ambient air passes therethrough.

2. The apparatus of claim 1, wherein the cowl includes at least one portion which extends from the outer edge of the second heat exchanger to the inner edge of a third heat exchanger core.

3. The apparatus of claim 2, wherein the said portion is at an angle in the range 20° to 60° to the adjacent inlet or outlet face of the second heat exchanger.

4. The apparatus of claim 1, wherein one of the first and second heat exchangers comprises an oil cooler.

5. The apparatus of claim 1, wherein one of the first and second heat exchangers comprises a radiator.

6. The apparatus of claim 1, wherein the first and second heat exchangers comprise an oil cooler and a radiator.

7. The apparatus of claim 6, wherein the oil cooler is upstream of the radiator.

8. The apparatus of claim 1, wherein each core of the third heat exchanger comprises a Charge Air Cooler.

9. The apparatus of claim 8, wherein the Charge Air Coolers are interconnected by charge air cooling connecting tanks.

10. The apparatus of claim 1, wherein cores of the third heat exchanger are arranged adjacent an inlet or outlet surface of the first and second heat exchangers.

11. The apparatus of claim 1, wherein the two or more cores of the third heat exchanger are interconnected in parallel.

12. The apparatus of claim 1, wherein the two or more cores of the third heat exchanger are interconnected in series.

13. The apparatus of claim 1, further comprising a fan for directing air through the arrangement of heat exchangers.

14. The apparatus of claim 13 wherein the fan is an axial fan.

15. The apparatus of claim 13, wherein the fan is arranged to push air through the heat exchangers.

16. The apparatus of claim 13, wherein the fan is arranged to draw air through the heat exchangers.

17. The apparatus of claim 1, wherein the second heat exchanger is arranged substantially parallel to the first heat exchanger.

18. The apparatus of claim 1, wherein the two or more cores of the third heat exchanger are arranged symmetrically about an air flow direction through the first and second heat exchangers.

19. The apparatus of claim 1, wherein the two or more cores of the third heat exchanger are arranged at an angle in the range 0° to 90° with respect to the second heat exchanger.

20. The apparatus of claim 1, wherein the two or more cores of the third heat exchanger are arranged at an acute angle with respect to the second heat exchanger.

21. The apparatus of claim 20, wherein the angle of the two or more cores of the third heat exchanger with respect to the second heat exchanger is in the range from 10° to 40°.

22. The apparatus of claim 20, wherein the angle of the two or more cores of the third heat exchanger with respect to the second heat exchanger is about 20°.

23. The apparatus of claim 1, wherein the two or more cores of the third heat exchanger are substantially perpendicular to the second heat exchanger.

24. The apparatus of claim 1, wherein the third heat exchanger comprises three interconnected cores.

25. The apparatus claim 24, wherein, one of the three cores is arranged at a top and the second and third cores of the third heat exchanger are arranged at sides of the second heat exchanger.

26. The apparatus of claim 1, wherein the second heat exchanger defines a sectional space envelope bounded by its periphery, and wherein the third heat exchanger overlaps said sectional space envelope.

27. The apparatus of claim 1, wherein the second heat exchanger defines a sectional space envelope bounded by its periphery, and wherein a majority of an area of the third heat exchanger overlaps said sectional space envelope.

28. The apparatus of claim 1, wherein the second heat exchanger defines a sectional space envelope bounded by its periphery, and wherein the third heat exchanger is arranged within said sectional space envelope.

* * * * *

UNITED STATES PATENT AND TRADEMARK OFFICE
CERTIFICATE OF CORRECTION

| | | |
|---|---|---|
| PATENT NO. | : 9,243,846 B2 | Page 1 of 1 |
| APPLICATION NO. | : 14/448219 | |
| DATED | : January 26, 2016 | |
| INVENTOR(S) | : Craig Cummins et al. | |

It is certified that error appears in the above-identified patent and that said Letters Patent is hereby corrected as shown below:

Title Page, item (54), and in the Specification, Column 1, Line 1, "HEAT EXHANGING APPARATUS" should be --HEAT EXCHANGING APPARATUS--.

Signed and Sealed this
Twenty-sixth Day of April, 2016

Michelle K. Lee
*Director of the United States Patent and Trademark Office*